United States Patent
Jeong

(10) Patent No.: US 6,327,262 B1
(45) Date of Patent: Dec. 4, 2001

(54) SAMPLE VALUE EXTRACTION APPARATUS IN DSS SYSTEM

(75) Inventor: Heon-Joo Jeong, Kyonggi-do (KR)

(73) Assignee: Hyundai Electronics Inds. Co. Ltd., Kyoungki-do (KR)

( * ) Notice: Subject to any disclaimer, the term of this patent is extended or adjusted under 35 U.S.C. 154(b) by 0 days.

(21) Appl. No.: 09/132,611

(22) Filed: Aug. 11, 1998

(30) Foreign Application Priority Data

Aug. 13, 1997 (KR) .................................................. 97-38630

(51) Int. Cl.⁷ ............................. H04L 12/28; H04L 12/56
(52) U.S. Cl. ............................ 370/395; 375/340; 714/758
(58) Field of Search .................................. 370/389, 395, 370/465; 375/340, 341; 714/746, 752, 758

(56) References Cited

U.S. PATENT DOCUMENTS

| | | | | |
|---|---|---|---|---|
| 5,638,408 | * | 6/1997 | Takaki | 375/341 |
| 5,784,409 | * | 7/1998 | Coles | 375/286 |
| 6,126,310 | * | 10/2000 | Osthoff et al. | 714/751 |
| 6,161,207 | * | 12/2000 | Lockhart et al. | 714/758 |

* cited by examiner

Primary Examiner—Ajit Patel
Assistant Examiner—Bob A. Phunkulh
(74) Attorney, Agent, or Firm—J. Harold Nissen; Lackenbach Siegel

(57) ABSTRACT

A sample value extraction apparatus in the DSS system and a method thereof are disclosed. The apparatus includes a decoder for decoding a data from a receiver, a sample value extraction unit for extracting a sample value using a CRC value based on the data received, and a descrambler for descrambling the data which is an output of an HEC decoder and the sample value extraction unit, thereby generating the PRBS data identical to that from the transmitter by correcting the receiver PRBS data and recovering the data from the transmitter in the receiver.

2 Claims, 5 Drawing Sheets

FIG. 2
PRIOR ART

| $U_{t-1}$ | $U_t$ | $U_{t+1}$ | $U_{t+2}$ | $U_{t+3}$ | $U_{t+4}$ | $U_{t+5}$ | $U_{t+6}$ | $U_{t+7}$ | $U_{t+8}$ | $U_{t+9}$ |

FIG. 3
PRIOR ART

| CLP + $U_{t-1}$ | $\overline{HEC}_8$ + $U_{t+211}$ | $HEC_8$ + $U_{t+1}$ | $HEC_6$ | $HEC_5$ | $HEC_4$ | $HEC_3$ | $HEC_2$ | $HEC_1$ | 1st pay_bit + $U_{t+8}$ | 2st pay_bi + $U_{t+9}$ |

— HEC INTERVAL —

1

SAMPLE VALUE EXTRACTION APPARATUS IN DSS SYSTEM

BACKGROUND OF THE INVENTION

1. Field of the Invention

The present invention relates to a DSS (Distributed Sample Scrambling) system for scrambling and descrambling, and more particularly to a sample value extraction apparatus in the descrambling part which extracts two sample values from received data in order to synchronize PRBS data (Pseudo Random Binary Sequence) which are in the scrambler and descrambler each other.

2. Description of the Conventional Art

Generally, the DSS system is adopted for use in the cell-based physical layer of BISDN (Broadband Integrated Service Digital Network) by CCITT (International Telegraph and Telephone Consultative Committee). This system is composed of a scrambler and a descrambler, randomizing data. Therefore, in the scrambler, The PRBS data is generated and exclusively ORed with the data inputted. In addition, two sample values are latched from the PRBS data at a uniform interval. That is, One sample value is latched at the uniform interval too. And these two latched sample values are transmitted via scrambled data, inserting them in the HEC8 and HEC7 each.

In the descrambler, using the transmitted sample values, the descrambler PRBS data is corrected and become identical to the scrambler PRBS data state. Therefore this descrambler PRBS data is added to the scrambled data and the descrambled data is obtained.

For example, in the case of the scrambling of the transmitter, if an input data is formed of "111110101", and the scrambler PRBS data is formed of "110101000", then the scrambled data is formed of "001011101".

In addition, in the case of the descrambling of the receiver, if the input data that is, received data is formed of "001011101", and the descrambler PRBS data is formed of "110101000", then the descrambled data is formed of "111110101" for thereby performing a binary arithmetic operation of 0 or 1 in accordance with the resultant data.

In the above-described DSS operation, PRBS data of the scrambler and the descrambler is generated, based on a creative polynomial expression of $X^{31}+X^{28}+1$, and the scrambling range is a header (4 bytes) and a payload (48 bytes) except for an HEC (1 byte).

In the sample latch method of transmitter, the sample value is latched from the PRBS data of the scrambler at every 212 bit through a 212 counter. And two sample values are inserted into the scrambled data HEC8 and HEC7.

As shown in FIG. 1, the conventional transmitter includes a scrambler 1 having a PRBS data generator 2 for generating a PRBS data, and an exclusive OR-gate 3 for exclusively ORing the PRBS data from the PRBS data generator 2 and an input data from the exclusive OR-gate 3, a HEC encoder 4 for encoding an output signal from the scrambler 1, and a sample value latching unit 6 for latching the sample value from the PRBS data generator 2, and an exclusive OR-gate 5 for exclusively ORing an output signal from the HEC encoder 4 and a sample value latched from the PRBS data generator 2.

FIG. 2 illustrates a part of PRBS data from the PRBS data generator 2. As shown in FIG. 1, the scrambler 1 performs a scrambling operation through entire input cell data interval except for an HEC 8-bit interval (HEC1–HEC8), as shown in FIG. 3.

The scrambled data are CRC-computed with respect to 32 bits from a start point of a cell by the HEC encoder 4, and the 8 bits which are the resultant value is inserted into the HEC 8 bit interval.

Next, two sample values ($U_{t+1}$ and $U_{t-211}$), which are obtained by the sample value latching unit 6 by latching the PRBS data from the scrambler 1 by one bit at the interval of 212 bits are exclusively ORed in the HEC eighteenth interval and the HEC seventh interval for thereby transmitting the data.

Namely, two sample data are latched by the one cell which is formed of 424 bits, and such the latched two sample data are exclusively ORed for thereby generating a transmission data as shown in FIG. 3. Here, $U_t$ represents the PRBS data generated at a current time, $U_{t+1}$ represents data after $U_t$, $U_{t-211}$ represents data which is 211st earlier than $U_t$, and HEC8, HEC7, . . . , HEC1 are all 8-bits which are generated by CRC-computing 32-bit, namely, 4-byte.

Therefore, the PRBS data of the scrambler and the input data are exclusively ORed from the start point of the cell by one bit, and in the HEC interval, two sample values are exclusively ORed after the HEC 8-bit signal which is obtained by CRC-computing 32-bit data is inputted.

However, in the conventional art, the sample value from the transmitter is included in the receiving data. In addition, a method for extracting the above-described values in the descrambler is not disclosed.

In the descrambler of DSS system, key issue is to generate the PRBS data, which is identical to the PRBS data of the scrambler. So first, it is need to extract the sample values, which are transmitted via the input data.

Therefore, this invention is derived to resolve the above disadvantages and presents a method of catching the sample values in the descrambler in order to gain synchronization for the scrambler PRBS data and the descrambler PRBS data.

SUMMARY OF THE INVENTION

Accordingly, it is an object of the present invention to provide a novel sample value extraction apparatus in a DSS system which overcome the aforementioned problems encountered in the conventional art.

It is another object of the present invention to provide a novel sample value extraction apparatus in a DSS system, which is capable of easily extracting a sample value when synchronizing a descrambler PRBS data in a receiver using a sample value from a transmitter.

In order to achieve the above objects, there is provided a sample value extraction apparatus which includes a HEC decoder for decoding a data from a receiver, a sample value extraction part for extracting a sample value using a CRC calculation based on data received, and a descrambler for descrambling data stream from a transmitter and the sample value extraction part.

In order to achieve the above objects, there is provided a sample value extraction method which includes the steps of performing one more the operation that a CRC calculation which is performed in a receiver with respect to the first 4 bytes using a CRC regeneration circuit when a data received is processed by a HEC decoder, and exclusively ORing the first bit on which a sample value among the next 1 byte of the 4 bytes is carried and the second bit.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a view illustrating a part of PRBS data output data from a conventional transmitter;

FIG. 3 is a view illustrating a part of data exclusively ORed with a PRBS data output data from a conventional transmitter;

DETAILED DESCRIPTION OF THE INVENTION

Figure 1:
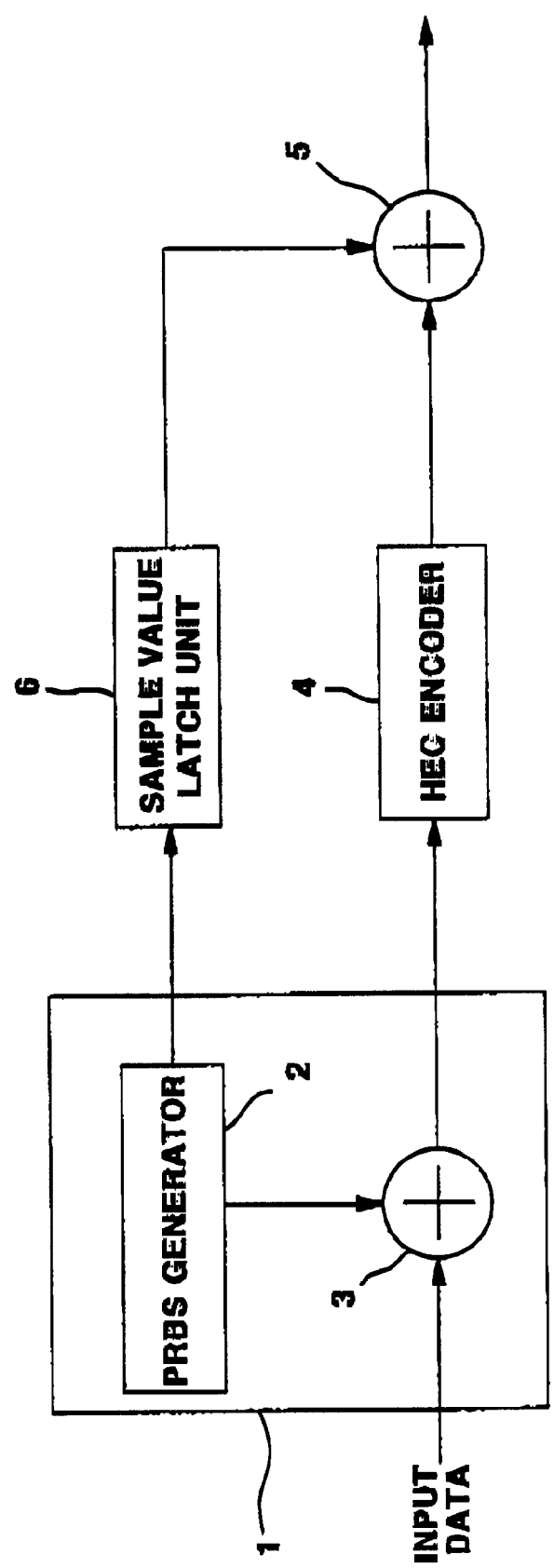
FIG. 1 is a block diagram illustrating the construction of a conventional transmitter.
Figure 4:
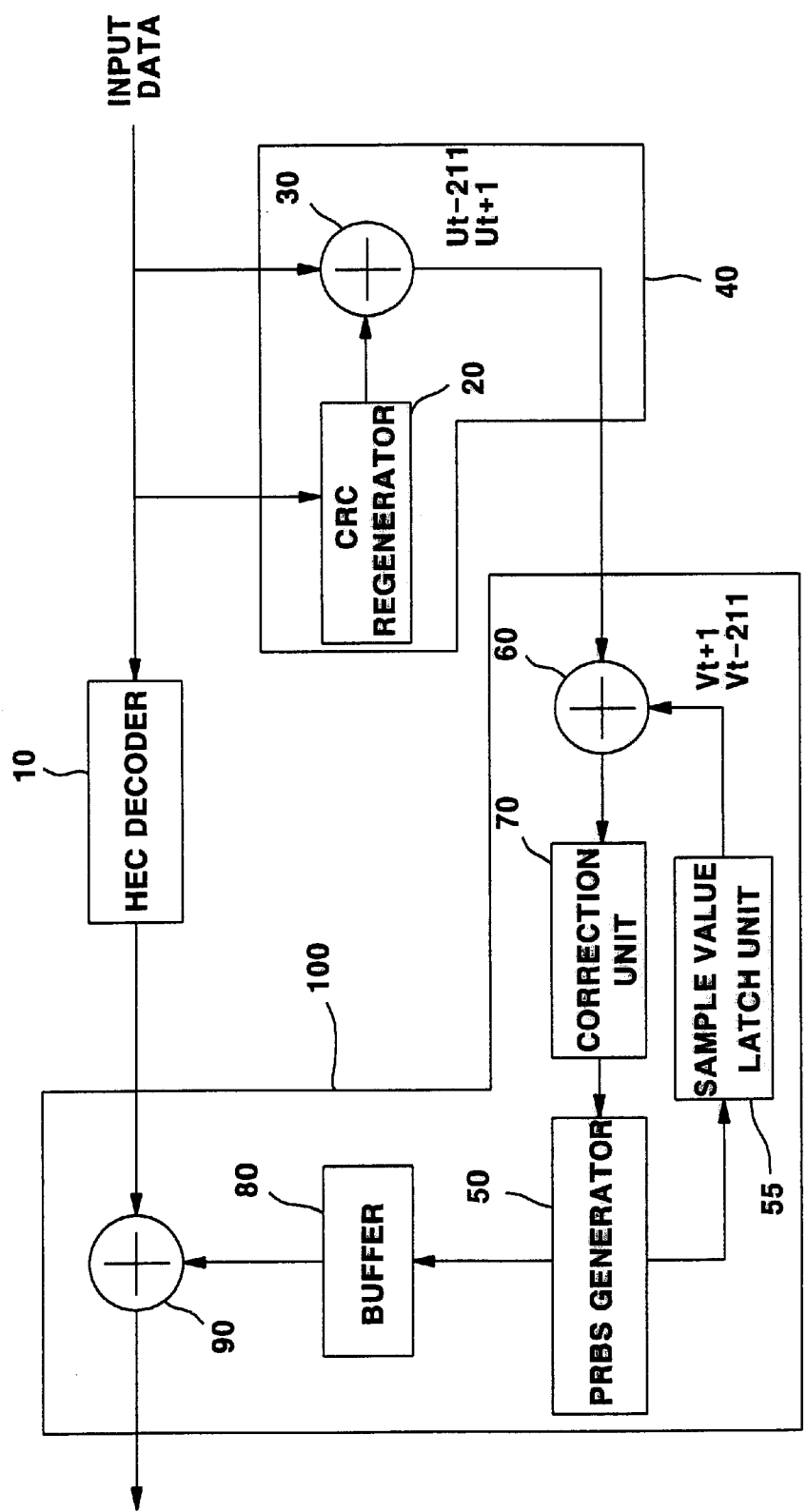
FIG. 4 is a block diagram illustrating the construction of a receiver according to the present invention.

As shown in FIG. 4, the sample value extraction apparatus in a DSS system according to the present invention includes a HEC decoder 10 for decoding a data received, a sample value extraction part for extracting a sample value from the data received, and a descrambler 100 for descrambling the data stream from the output of HEC decoder and the sample value extraction part 40.

The sample value extraction part 40 includes a CRC regenerator 20 for computing a CRC value with respect to the first 4 bytes of a cell, and an exclusive OR-gate 30 for exclusively ORing the value generated by the CRC regenerator 20 and the first 2 bits of the HEC interval and extracting sample values($U_{t-211}$, $U_{t+1}$).

The descrambler 100 includes a PRBS data generator 50 for latching a sample value by the same manner as the PRBS data of the transmitter, an exclusive OR-gate 60 for exclusively ORing sample values ($V_{t-211}$, $V_{t+1}$) of a sample value latching unit (55) which latches sample values from the PRBS data generator 50 to compare the two extracted sample values ($U_{t-211}$, $U_{t+1}$) with the sample value from the sample value extraction part 40, a correction unit 70 for correcting the PRBS data by a resultant signal from the exclusive OR-gate 60 and the PRBS data generator 50, a 40 bit buffer 80 for compensating a 40 bit delay by the HEC decoder 10, and an exclusive OR-gate 90 for exclusively ORing an output data from the HEC decoder 10 and the PRBS data which is delayed by the buffer 80.

The PRBS (pseudo Random Binary Sequence) generator latches the sample value in the same manner as the PRBS of the transmitter.

Figure 5:
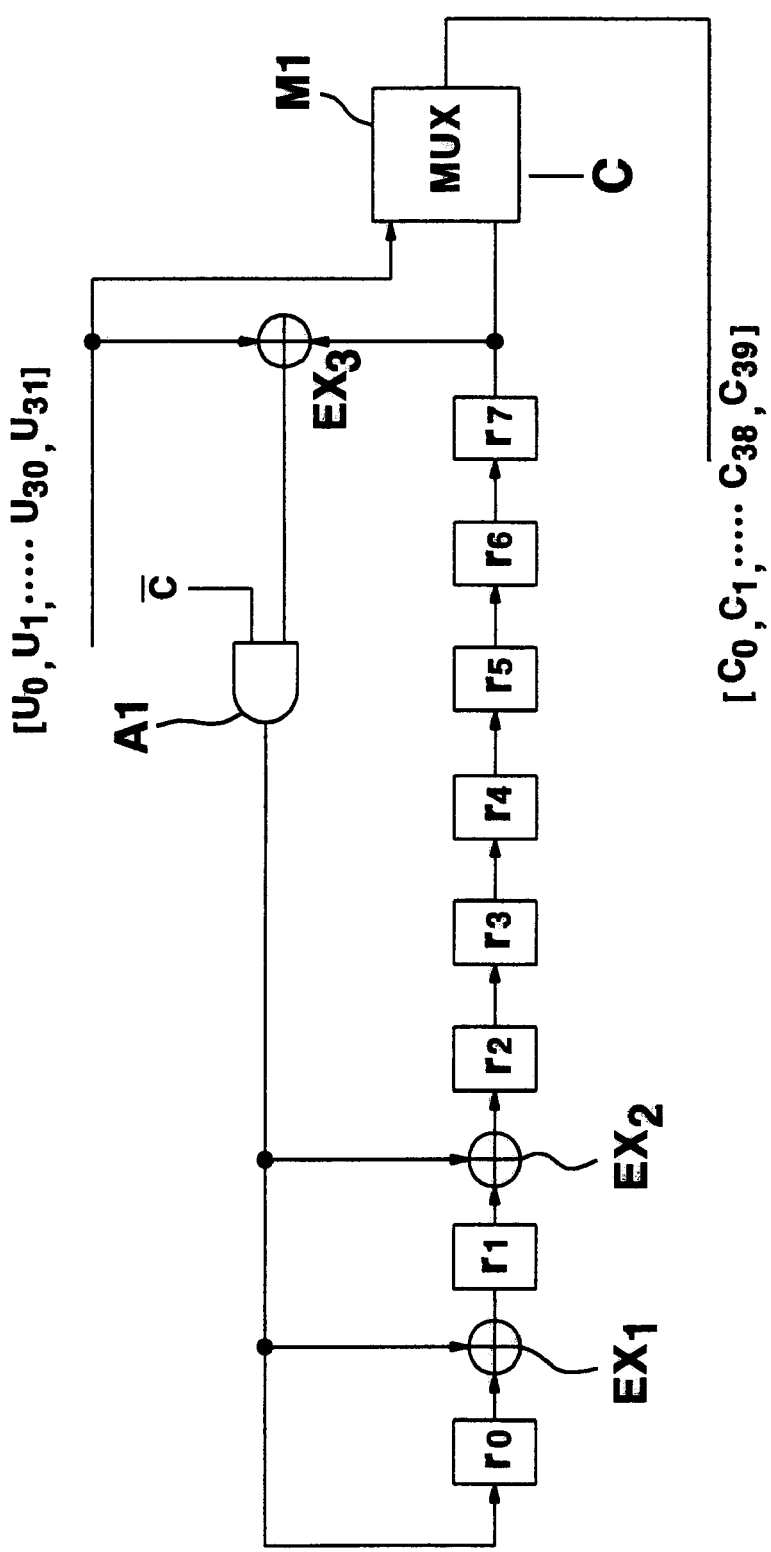
FIG. 5 is a view illustrating the CRC regenerator of FIG. 4 according to the present invention.

As shown in FIG. 5, the CRC regenerator 20 includes an AND-gate A1 for ANDing input signals, an exclusive OR-gate EX1 for exclusively ORing an output signal from the AND-gate A1 and the output signal from a register R0, an exclusive OR-gate EX2 for exclusively ORing the output signal from the AND-gate A1 and an output signal from a register R1, a plurality of registers R2 through R7 for temporarily storing the output signal from the exclusive OR-gate EX2 and to output the temporarily stored signal to the exclusive OR-gate EX3 and the multiplexor M1, respectively, and a multiplexor M1 for multiplexing an output signal from the register R7 and an output signal from the HEC decoder 10 to provide an output to the PRBS data generator 30.

The operation of the sample value extraction apparatus according to the present invention will be explained with reference to the accompanying drawings in more detail. First, in the transmitter, PRBS data is summed based on a binary arithmetic operation by one bit with respect to the entire cells except for the HEC region, and the CRC is computed with respect to first 32 bits of the scrambled header and the resultant value of 8 bits (HEC8~HEC1) is inserted, so make up 1 cell header of 40 bits. In the sample latch part 6, a first sample value ($U_{t-211}$) latched 211 bits earlier than the start of HEC8 (the current time) from the PRBS data is exclusively ORed with a first bit of the HEC region, that is, HEC8, and a second sample value a($U_{t+1}$) latched next the current time ($U_t$) from the PRBS data is exclusively ORed with a second bit of the HEC region, that is, HEC7. And as shown in FIG. 3, such a data is sent to the receiver. In the receiver, as shown in FIG. 4, the CRC computation which is to be performed in the transmitter with respect to first 4 bytes is performed again by the CRC regenerator 20 of the sample value extraction part 40, while the received data is processed by the HEC decoder 10.

In the receiver, the CRC value is computed by the CRC regenerator 20 of the sample extraction unit 40 with respect to the first 4 bytes of the cell, and such the computed value and first 2 bits of the HEC interval of the received data are exclusively ORed by the exclusive OR-gate 30, for thereby extracting the sample values ($U_{t-211}$ and $U_{t+1}$).

As shown in FIG. 5, the CRC regenerator 20 computes the CRC value with respect to the first 4 bytes of the cell header based on a creative polynomial expression "$X^8+X^2X+1$".

In case of the first 4 bytes (32 bits), the control signal C from the controller is a low level output signal from the multiplexor M1 and is inputted into the 8 registers R0 through R7. At this time, /C is high level and the AND-gate A1 operates as a gate, so that an output from the AND-gate A1 is inputted to the front registers. Here, the input of the multiplexor M is determined in accordance with the control signal C. 32 bits among 40 bits remain low level and input data ($U_0$–$U_{31}$) are outputted through the multiplexor M. Thereafter, during the 8 bits of the high level, the output value from the register R7 instead of the input data ($U_0$–$U_{31}$) is outputted through the multiplexor M.

Here, C and /C represent header 5 bytes, namely, the signal operating during 40 bits in such a manner that the signal C has a low level during 32 bits and a high level during 8 bits while the signal /C has a high level during 32 bits and a low level during 8 bits.

Therefore, during the 8 bits after the 32 bits, the signal /C has a low level so that no input is provided to the front registers from the AND-gate A1 and, in this state, the internal values of the registers are outputted through the multiplexor M1.

At this time, since during the 32 bits among the 40 bits are provided the registers with inputs, the control signal /C becomes a low level during the 8 bits after the 33 bits. Therefore, bits after the 33 bits become low level so that the data inputted thereafter become invalid.

The principle for obtaining the sample values from the received data based on the CRC computation will be explained as a example.

Figure 6:
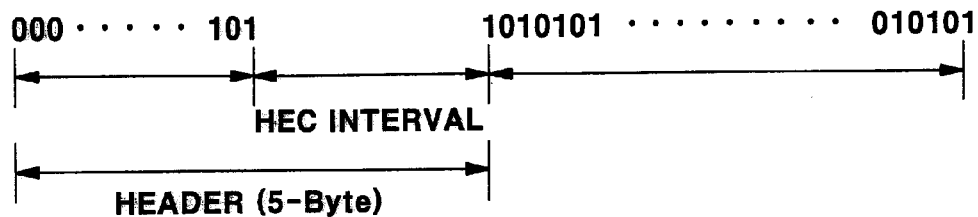
FIGS. 6 through 10 are views illustrating a sample value extraction method according to the present invention.
Figure 7:
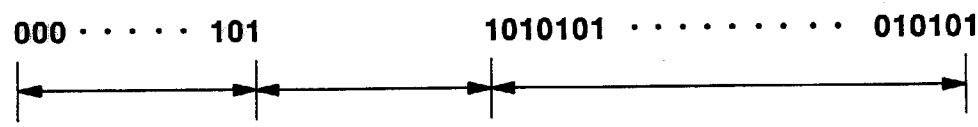

In the case of the transmitter, it is the scrambled data except in the 8 bit interval of the HEC as shown in FIG. 6, and then the CRC is computed with respect to the header 4 bytes, and the thusly computed resultant value 8 bits are inserted into the HEC interval as shown in FIG. 7.

Figure 8:
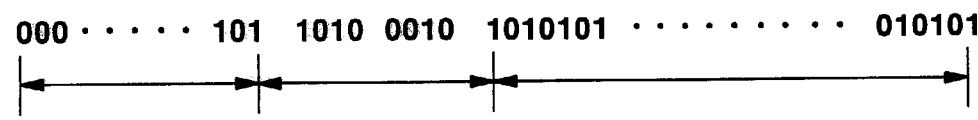

Two sample values and the values of the HEC8 and HEC7 are exclusively Ored. At this time, the sample value is "11" and the values of the HEC8 and HEC7 are "01", respectively. The resultant value is "10" and then are inserted as shown in FIG. 8.

Figure 9:
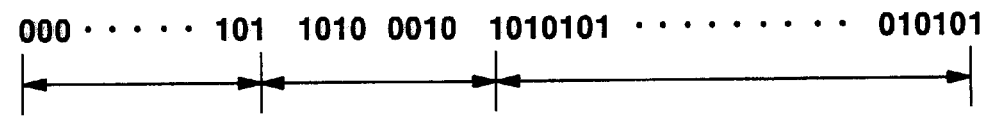

In addition, FIG. 9 illustrates the data from the receiver. The CRC is computed with respect to 4 bytes from the start point of the cell for thereby obtaining a CRC computation value "0110 0010.

Figure 10:
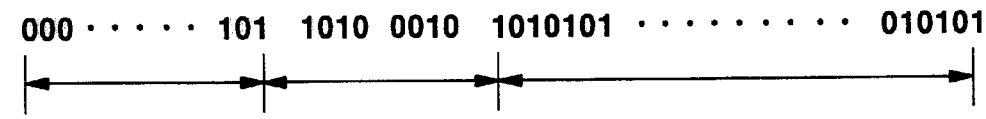

Next, upper 2 bits and the receiving data are exclusively ORed, and the sample value as shown in FIG. 10 is "11" based on $0 \oplus 1 = 1$ and $1 \oplus 0 = 1$.

Therefore, it is possible to extract the transmitted sample values based on the received data by the CRC computation.

Namely, the first bit and the second bit of one byte after the first 4 bytes of cell header are exclusively ORed by the exclusive OR-gate 30 for thereby extracting the accurate sample values.

In addition, the sample values $V_{t+1}$ and $V_{t-211}$ are latched from the PRBS data generator 50 of the descrambler 100 in the same manner as the PRBS data generator of the transmitter and compared with the sample values extracted by the sample value extractor 40 through the exclusive OR-gate 60.

If the sample value $U_{t-211}$ from the transmitter and the sample value $V_{t-211}$ latched by the sample value latch unit 55 of the receiver are different, then the correction unit 70 is activated and a correction signal is outputted to the PRBS data generator 50 and the PRBS data of the descrambler is corrected at 33rd point based on the start point of the cell.

If the sample value $U_{t+1}$ from the transmitter and the sample value $V_{t+1}$ latched by the sample value latch unit 55 of the receiver are different, then the correction unit 70 is activated and a correction signal is outputted to the PRBS data generator 50 and the PRBS data of the descrambler is corrected at 245th point based on the start point of the cell.

After the descrambler 100 is fully synchronized with the scrambler, the data from the HEC decoder 10 and the data from the PRBS data generator 50 are exclusively ORed by the exclusive OR-gate 90 for thereby implementing a descrambling operation, so that the same cell as the cell from the transmitter is received.

At this time, since the output terminal of the PRBS data generator 50 is connected with the buffer 80, the problem that the data is delayed by 40 bits by the HEC decoder 10 is solved, thereby coinciding the data.

As described above, in the sample value extraction apparatus of the present invention, while the data is processed by the HEC decoder 10, the CRC computation in the sample value extraction part 40 which is performed in the transmitter with respect to the first 4 bytes through the CRC regeneration circuit 20 is performed again, and then the first bit and the second bit of CRC resultant value 8 bits are exclusively ORed with the received data for thereby easily extracting the sample value of the data received.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. In an asynchronous transfer mode (ATM) adapting a DSS (Distributed Sample Scrambling) system in which a sample value is latched to a mixed transmission data and is transmitted through a HEC encoder, and a receiver decodes the value using a HEC decoder, a sample value extraction apparatus in a DSS system, comprising:

decoder means for decoding a data from the receiver;

a sample value extraction means for extracting the sample value using a CRC value from the received data;

a PRBS (Pseudo Random Binary Sequence) generator for latching the sample value in the same manner as the PRBS of the transmitter;

a sample value latch unit for latching two sample values in the PRBS generator;

a first exclusive OR-gate for exclusively Oring one of the sample values latch by the sample value latch unit and the sample extracted from the sample value extraction means;

a correction circuit for correcting an output from the exclusive OR-gate and transmitting to the PRBS generator;

a 40-bit buffer for compensating a 40-bit delay by the HEC decoder; and a second exclusive OR-gate for exclusively Oring and output from the HEC decoder and a data delayed by the buffer.

2. The apparatus according to claim 1, wherein said sample value extraction means comprises:

CRC regeneration means for computing the CRC value with respect to first 4 bytes of a cell; and said second exclusive OR-gate for exclusively ORing a value generated by said CRC regeneration means and first 2 bits in the HEC interval of input data to extract the sample value.

* * * * *